United States Patent

Gast

[11] Patent Number: 4,484,232
[45] Date of Patent: Nov. 20, 1984

[54] METHOD AND CIRCUIT ARRANGEMENT FOR CONTRAST INTENSIFICATION

[75] Inventor: Uwe Gast, Rammsee, Fed. Rep. of Germany

[73] Assignee: Dr. Ing. Rudolf Hell GmbH, Fed. Rep. of Germany

[21] Appl. No.: 421,232

[22] Filed: Sep. 22, 1982

[30] Foreign Application Priority Data

Oct. 3, 1981 [DE] Fed. Rep. of Germany ....... 3139483

[51] Int. Cl.³ .............................................. H04N 1/40
[52] U.S. Cl. ..................................... 358/299; 358/284
[58] Field of Search ................. 358/284, 287, 80, 280, 358/299

[56] References Cited

U.S. PATENT DOCUMENTS

| | | | |
|---|---|---|---|
| 2,691,696 | 10/1954 | Yule | 358/280 |
| 2,962,548 | 11/1960 | Taudt | 358/284 |
| 4,335,407 | 6/1982 | Atoji | 358/284 |
| 4,403,258 | 9/1983 | Balzan | 358/284 |

FOREIGN PATENT DOCUMENTS 2089164 6/1982 United Kingdom .

*Primary Examiner*—Howard W. Britton
*Attorney, Agent, or Firm*—Hill, Van Santen, Steadman & Simpson

[57] ABSTRACT

A method and an apparatus are provided for contrast intensification in the reproduction of masters in the field of electronic image processing by engraving devices and scanners. In the image-point-wise, opto-electronic master scanning, two outer field signals are obtained in addition to the image signal by scanning a first outer field and a larger, second outer field. A first differential signal and a second differential signal are generated from the image signal and the outer field signals and a third differential signal is generated from the two outer field signals. The first differential signal is combined with at least one of the other two differential signals to form an auxiliary signal which is added to the first differential signal in order to obtain a correction signal. The correction signal is then superimposed on the image signal for the purpose of contrast intensification. By employing a second outer field signal, it is particularly the disturbing edges around hard master contours which are avoided.

19 Claims, 4 Drawing Figures

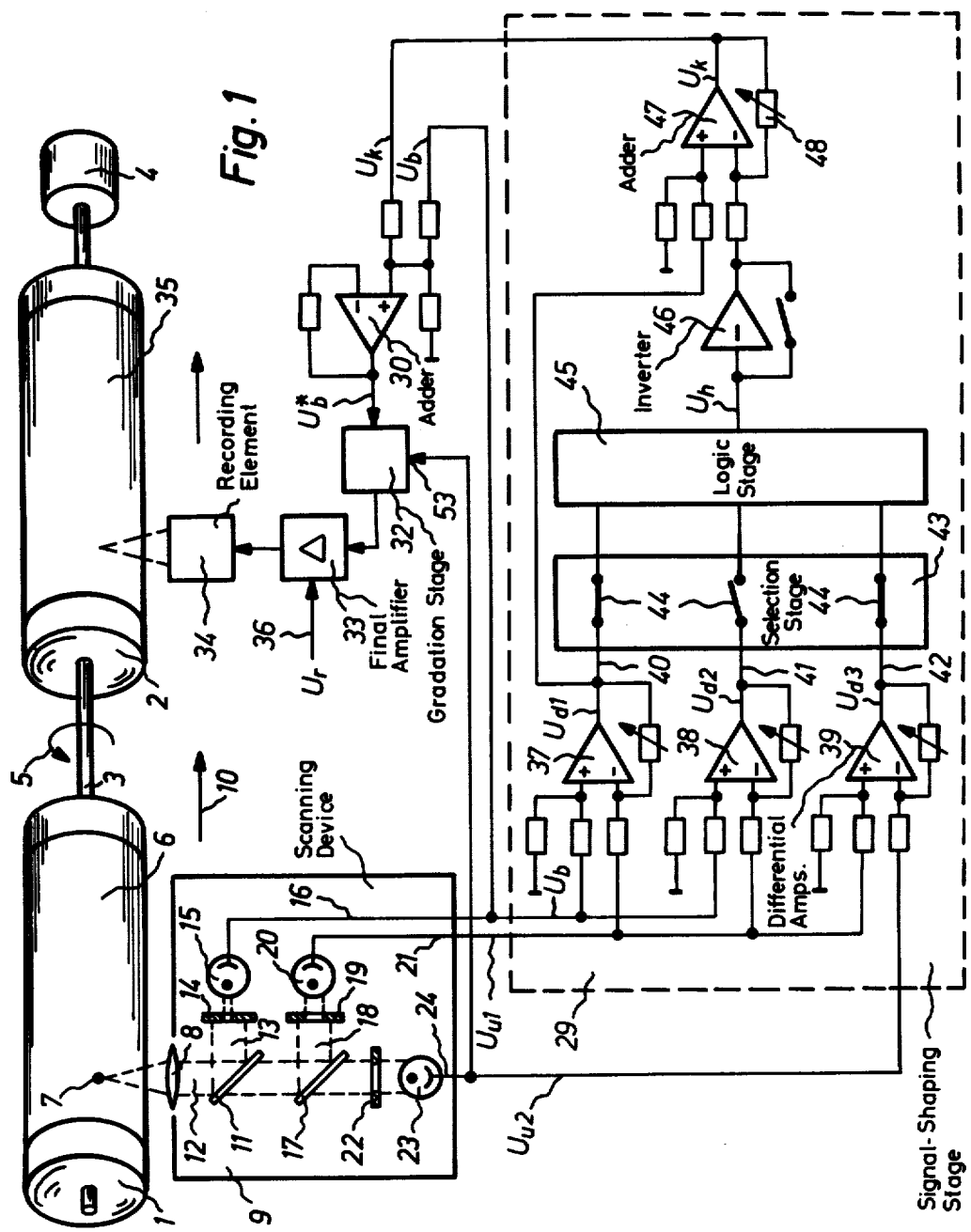

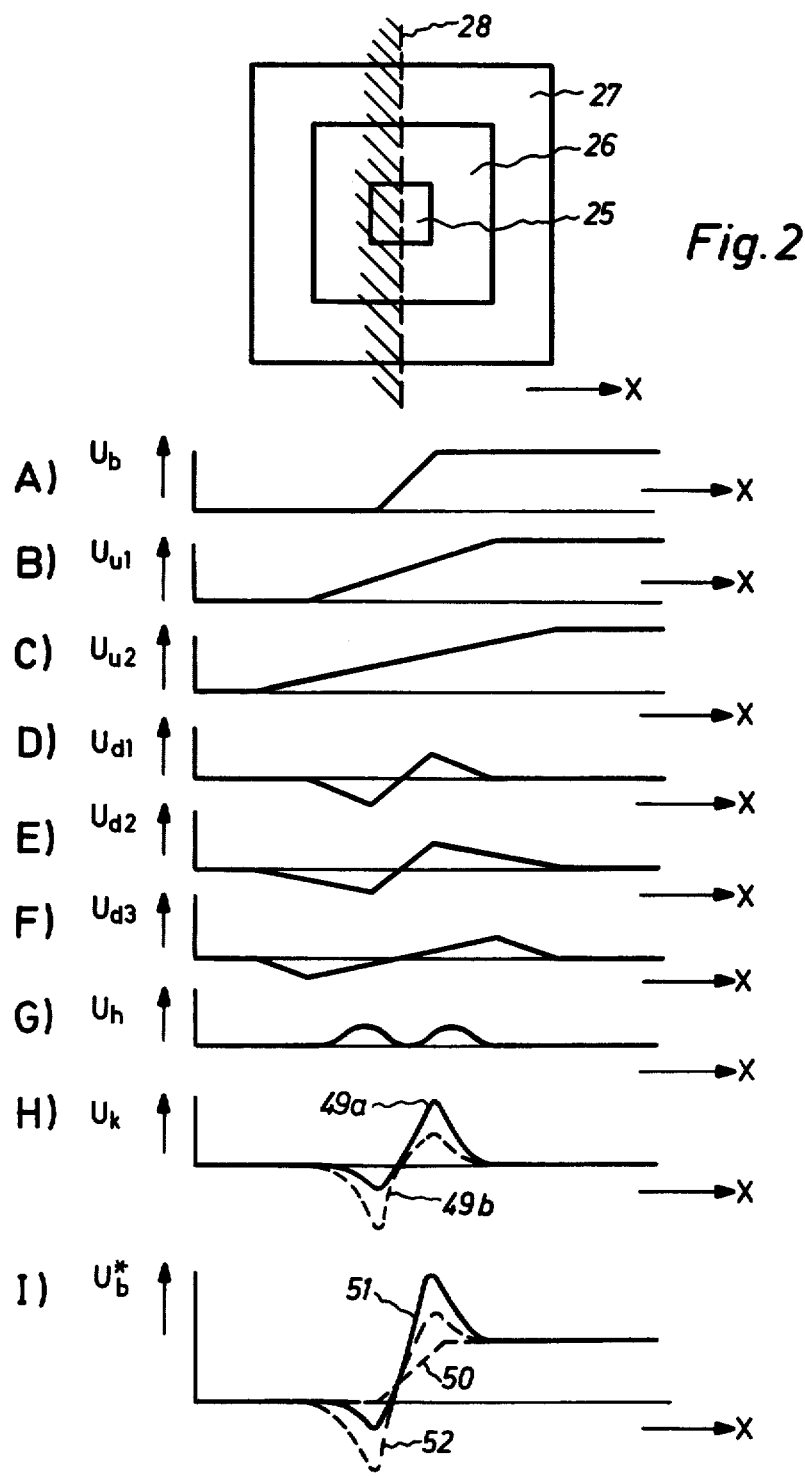

METHOD AND CIRCUIT ARRANGEMENT FOR CONTRAST INTENSIFICATION

BACKGROUND OF THE INVENTION

1. Field of the Invention

The present invention relates to electronic printing form production utilizing engraving devices and scanners, and is more particularly concerned with a method and a circuit arrangement for contrast intensification in the reproduction of masters.

2. Description of the Prior Art

In electronic printing form production utilizing engraving devices and scanners, a master to be reproduced is scanned point-wise and line-wise with an opto-electronic scanning element and the image signal thereby obtained is corrected in accordance with the requirements of the reproduction process. The corrected image signal controls a recording element which undertakes the reproduction of the master on a recording medium.

Given printing form engraving devices, the production of the raster points occurs with an engraving stylus of an electro-magnetic engraving element or with the energy beam of an energy beam generator as the recording element. Given scanners, the recording element is a light source for film exposure.

In most cases, the master to be reproduced is a combination consisting of continuous-tone or half-tone images and of written characters or line elements or patterns of graphic illustrations.

As early as the photographic production of a film master, the contrast, particularly in the fine details, is reduced in comparison to the original due to unsharpness in the film layers, as well as due to enlargement for transfer. Added thereto is the limitation of resolution of the opto-electronic scanning element by scatter light and by unsharpness of the scanning lens, a further contrast reduction occurring in the reproduction as a result thereof which the human eye perceives as unsharpness or lack of definition.

Therefore, it is necessary to regain the reduced contrast or, respectively, the reduced image sharpness in the printing form production or, for editorial reasons, of even increasing the contrast in comparison to the original.

For the purpose of contrast or, respectively, sharpness intensification, it is already known from U.S. Pat. No. 2,691,696, fully incorporated herein by this reference, to scan not only the current image point with an image point diaphragm but, rather, to also scan its surrounding field with a correspondingly larger outer field diaphragm, to form the differential signal of the outer field signal and the image signal, and to superimpose the differential signal on the image signal to a selectable degree as a correction signal. This measure, which corresponds to unsharp masking in the photographic reproduction technique, leads to an improvement of the detail contrast or, respectively, of the image sharpness at jumps of gradation or at contours since, in the direct environment of a gradation jump, a dark image passage is recorded darker and a light image passage is recorded lighter than at some distance from the gradation jump. In the known solution, the amplitude of the correction signal is dependent on the size of the respective gradation jump so that, normally, line elements and character contours (high gradation jumps) are greatly corrected but, in contrast thereto, contours in continuous-tone or half-tone images (small gradation jumps) are only slightly corrected.

In practice, however, it is a matter, particularly, of boosting the detail contrast in continuous-tone or half-tone areas since line elements and character contours are reproduced sharper anyway. In order to be able to attain the desired effect in continuous-tone or half-tone areas at all, the available correction signal must be superimposed, full strength, on the image signal in the cited process. In this case, however, hard contours arise, particularly at highlights, and disturbing, white margins or edges arise around black characters, these being particularly noticeable when, for example, black print is placed in a gray scale. Therefore, the disadvantage of the known technique is that it can be respectively optimized only to continuous-tone respectively half-tone images or to line elements.

Attempts have already been made to improve the known method by distortion, amplitude limitation or by an asymmetrical treatment of the correction signal, as well as by influencing the correction signal as a function of a shift mask (German Letters Patent No. 9 49 443, German Letters Patent No. 10 39 842 and German Letters Patent No. 22 26 990), however, there are then still difficulties in practice of avoiding such margins or edges or of at least reducing the same in such a manner that they are no longer disturbing.

SUMMARY OF THE INVENTION

The object of the invention, therefore, is to provide a method and a circuit arrangement with which a good contrast intensification or, respectively, sharpness increase can be achieved both in continuous-tone or half-tone images as well as at line elements and character contours when reproducing masters.

According to the present invention, a method is provided for contrast intensification in the reproduction of masters, given which a master is opto-electronically scanned image point-wise and line-wise in order to obtain an image signal and a correction signal superimposed from the image signal for contrast intensification. The method is particularly characterized by obtaining a first outer field signal or unsharp signal by determining the mean brightness of a first scanning area around a respectively scanned image point on the master which is larger than the image points. A second outer field signal or unsharp signal is obtained by determining the mean brightness of a second scanning area around the respectively scanned image point on the master, the second area being larger than the first scanning area. A first differential signal is then formed from the image signal and from the first outer field signal and a second differential signal is formed from the image signal and from the second outer field signal and a third differential signal is formed from the two outer field signals. The first differential signal is linked with at least one of the other differential signals for forming an auxiliary signal and the correction signal is generated by adding the first differential signal and the auxiliary signal which may, under certain conditions, be inverted.

In practicing the method of the invention set forth above, a circuit arrangement is provided in which a first signal source is connected to a signal-shaping stage for generating a first outer field signal which is a measure for the mean brightness of a first scanning area around the respectively scanned image point on the master, the first scanning area being larger than the image point. A second signal source is connected to the signal-shaping stage for generating a second outer field signal which is a measure for the mean brightness of the second scanning area which is larger than that of the first scanning area. The signal-shaping stage is provided by a first differential stage for forming a first differential signal from the image signal and the first outer field signal, its inputs being connected to the scanning element and to the first signal source. A second differential stage is provided for forming a second differential signal from the image signal and from the second outer field signal, its inputs being connected to the scanning element and to the second signal source. A third differential stage is provided for forming a third differential signal from the two outer field signals, its inputs being connected to the two signal sources. A selection stage is connected to the differential stages for selecting differential signals and a logic stage is connected to the selection stage for forming the auxiliary signal from the selected differential signals.

A further stage is connected to the logic stage and to the first differential stage for forming the correction signal by adding or, respectively, subtracting the first differential signal and the auxiliary signal. The correction signal is then fed to a super position stage which superimposes the image signal and the correction signal.

BRIEF DESCRIPTION OF THE DRAWINGS

Other objects, features and advantages of the invention, its organization, construction and mode of operation will be best understood from the following detailed description taken in conjunction with the accompanying drawings, on which:

FIG. 1 is a basic circuit diagram of an electronic image reproduction device constructed in accordance with the present invention;

FIG. 2 is an illustration of the various scanning areas employed in practicing the invention;

FIG. 3 is a plurality of graphic illustrations of signal curves given an asymmetrical contrast boost.

DESCRIPTION OF THE PREFERRED EMBODIMENTS

Figure 4:
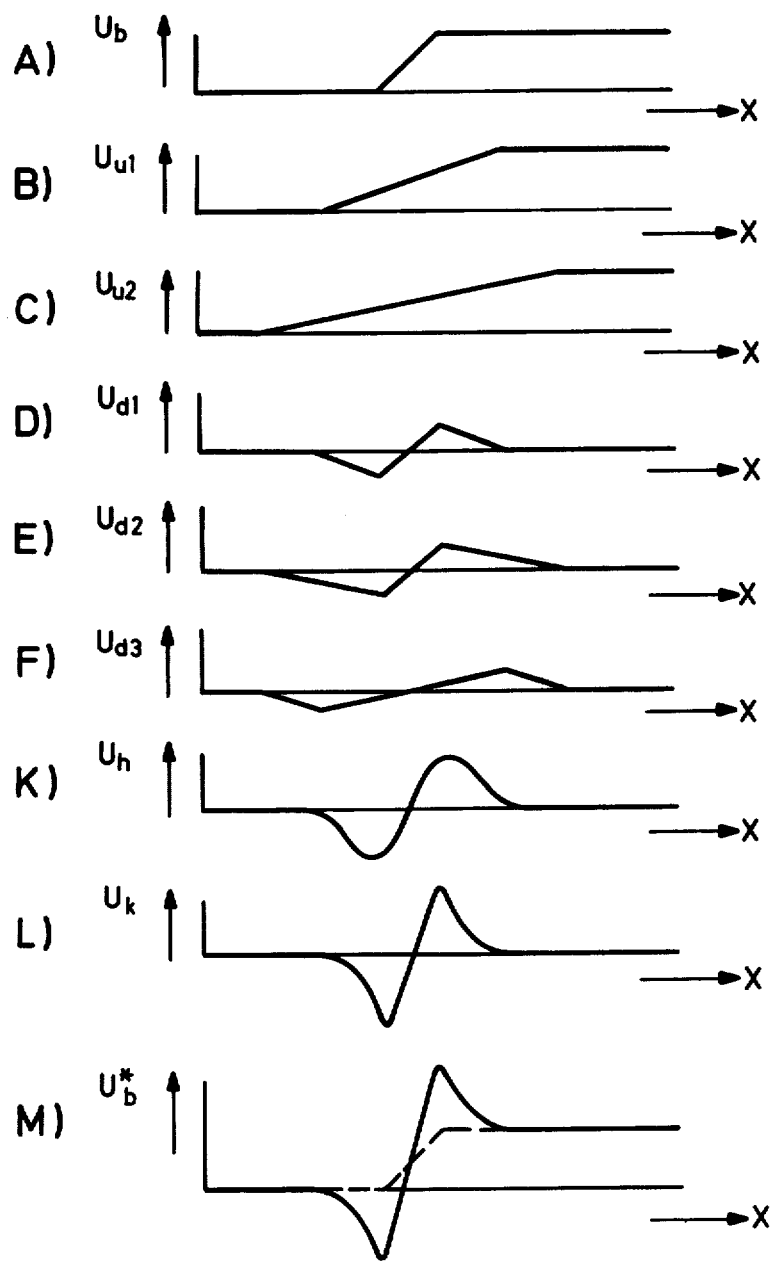
FIG. 4 is a plurality of graphic illustrations of signal curves given a symmetrical contrast boost.

As mentioned above, FIG. 1 shows a basic circuit diagram for an electronic image reproduction device having a signal-shaping stage for contrast intensification.

As also set forth above, FIG. 2 and the signal curves illustrated in FIGS. 3 and 4 illustrate the manner of operation of the circuit arrangement of FIG. 1.

Referring to FIG. 1, a scanning drum 1 and a recording drum 2 are mechanically connected to one another by a shaft 3 and are driven in common in the direction of an arrow 5 by a motor 4. A master 6 which may exhibit continuous-tone or half-tone images, line elements and character contours is clamped onto the scanning drum 1. The master 6 is illuminated point-wise by a light point 7 of a light source (not shown). Given an opaque master, the reflected scanning light and, given a transparency master, the transmitted scanning light modulated with the brightness information of the master 6 proceeds over a scanning lens 8 into a scanning device 9 in which an image signal $U_b$ (FIGS. 3 and 4), a first unsharp masking signal or first outer field signal $U_{u1}$ and a second unsharp masking signal or second outer field signal $U_{u2}$ are generated. The scanning device 9 moves axially past the scanning drum 1 in the direction of an arrow 10.

Given the illustrated exemplary embodiment of the scanning device 9 for black/white masters, a semi-permeable mirror 11 which reflects a first portion 13 out of the scanning light beam 12 is located in the beam path of the scanning lens 8. The first beam portion 13 impinges onto an image point diaphragm 14. The component of the first beam portion 13 passing through the aperture of the image point diaphragm 14 is converted in an opto-electronic transducer 15 into the image signal $U_b$ which is available on a line 16. The image signal $U_b$ is a measure of the brightness of an elemental scanning area on the master 6 referred to as an image point whose size is determined by the aperture of the image point diaphragm 14.

A second semi-permeable mirror 17 in the beam path of the scanning lens 8 reflects a second beam portion 18 out of the scanning light beam 12. The second beam portion 18 impinges onto a first outer field diaphragm 19 whose aperture is greater than that of the image point diaphragm 14. The component of the second beam portion 18 passing through the aperture of the first outer field diaphragm 19 is converted in the second opto-electronic transducer 20 into the first outer field signal $U_{u1}$ which is available on the line 21. The first outer field signal $U_{u1}$ is a measure of the mean brightness of a first scanning area (first outer field) which is greater in size than that of the elemental scanning area of the image point and which is determined by the aperture of the first outer field diaphragm 19 or, expressed in different terms, a measure of the mean brightness of an image point area surrounding the current image point.

The scanning light beam 12 which has proceeded through the semi-permeable mirror 17 impinges on a second outer field diaphragm 22, passes through the aperture thereof and is converted in a third opto-electronic transducer 23 into the second outer field signal $U_{u2}$ which is available on a line 24. The aperture of the second outer field diaphragm 22 is even larger than that of the first outer field diaphragm 19, so that an even greater, second scanning area (second outer field) is covered about the current image point.

For the purpose of illustration, the elemental scanning area 25 (image point) as well as the first scanning area 26 concentric thereto (first outer field) and the second scanning area 27 (second outer field) are illustrated on the master 6 in FIG. 2, their shapes being assumed to be quadratic. However, the scanning areas can, for example, also be circular or can have any other desired shape. Also indicated in FIG. 2 is a contour line 28 on the master 6 (light/dark jump), which may be assumed to move in the X direction as a result of the relative motion between the master 6 and the scanning device 9.

In FIGS. 3 and 4, the respective diagrams (A), (B) and (C) illustrate the signal progressions of the image signal $U_b$, the first outer field signal $U_{u1}$ and the second outer field signal $U_{u2}$ as a function of the path X on which, according to FIG. 2, the contour line 28 moves over the scanning areas.

The invention is not restricted to the illustrated exemplary embodiment of the scanning device 9 for the simultaneous evaluation of the outer field.

In the optical structure, annular mirrors can also be employed instead of the semi-permeable mirrors, given which annular mirrors, the opening in the center of the mirror determining the elemental scanning area of the image point and the annular surface determining one outer field.

For the purpose of the simultaneous detection of the image point environment, the scanning device 9 can also be equipped with photodiode lines or with a photodiode matrix. Another embodiment of the scanning device 9 comprises a traditional scanning element which produces only one image signal. The image signal values of a plurality of line or line sections adjacent to the currently scanned line are then intermediately stored in line memories which follow the scanning element. Finally, the scanning element can be followed by a so-called whole image memory in which all image signal values of a master are deposited. In both cases, the outer field signals are calculated from the stored image signal values of the individual scanning areas.

Of course, a scanning device for color scanning can also be employed instead of a scanning device for black/white scanning.

Returning now to FIG. 1, the scanning device 9 is connected over the lines 16, 21 and 24 to a signal-shaping stage 29 in which a correction signal $U_k$ is derived from the image signal $U_b$, the first outer field signal $U_{u1}$ and the second outer field signal $U_{u2}$. The correction signal $U_k$ is superimposed on the image signal $U_b$ in a following adder 30 for contrast enhancement of gradation jumps in the master or, respectively, for intensifying image signal jumps. The intensified image signal $U_b^*$ is modified according to the requirements of the reproduction process in a gradation stage 32, is amplified in a final amplifier 33, and, finally, controls a recording element 34 which undertakes the point-wise and line-wise read-recording of the master 6 on a recording medium 35 carried on the recording drum 2.

In order to produce a printing raster, a raster signal $U_r$ is provided on a line 36 and can be superimposed on the image signal $U_b^*$ in the final amplifier 33.

The recording element 34 likewise moves axially along the recording drum 2 in the direction of the arrow 10. Forward feed devices for the scanning device 9 and for the recording element 34 are not illustrated but are well known in the art. When the described image production device is a printing form engraving device, then the recording element 34 is, for example, an electromagnetic engraving element having a stylus as the cutting tool for the raster points or is an energy beam generator whose energy beam forms the raster points by material evaporation. When, in contrast thereto, it is a matter of a scanner, then the recording element 34 is a light source which is brightness-modulated by the image signal which produces rastered or un-rastered re-recording on a film material.

In the following, the structure and the manner of operation of the signal-shaping stage 29 for forming the correction signal $U_k$ is set forth in greater detail.

The signal-shaping stage 29 exhibits three differential amplifiers 37, 38 and 39 having variable amplification in which the following three differential signals $U_{d1}$, $U_{d2}$ and $U_{d3}$ on the lines 40, 41 and 42 are formed from the image signal $U_b$, the first outer field signal $U_{u1}$ and the second outer field signal $U_{u2}$ $$U_{d1}=g_1(U_b-U_{u1})$$

$$U_{d2}=g_2(U_b-U_{u2})$$

$$U_{d3}=g_3(U_{u1}-U_{u2}) \quad (1)$$

The diagrams (D), (E) and (F) in FIGS. 3 and 4 respectively illustrate the corresponding differential signals $U_{d1}$, $U_{d2}$ and $U_{d3}$. The analysis factors $g_1$, $g_2$ and $g_3$ correspond to the amplification factors of the differential amplifiers 37, 38 and 39.

The differential signals $U_{d1}$, $U_{d2}$ and $U_{d3}$ are supplied by way of a selection stage 43 to a logic stage 45. Those differential signals $U_{d1}$, $U_{d2}$ and $U_{d3}$ which are to participate in the formation of the correction signal $U_k$ are through-connected to the logic stage 45 by way of switches 44 in the selection stage 43. As is still to be shown, a symmetrical or asymmetrical contrast enhancement at contours or, respectively, an intensification at image signal jumps can be achieved by the selection of the appertaining differential signals $U_{d1}$, $U_{d2}$ and $U_{d3}$, whereby, in the case of a symmetrical intensification, the positive amplitude and the negative amplitude of the correction signal $U_k$ are equal in terms of magnitude and, in the case of an asymmetrical intensification, are unequal.

First, an auxiliary signal $U_h$ is obtained from the logic stage 45 from the selected differential signals $U_{d1}$, $U_{d2}$ and $U_{d3}$. The logic stage 45 is followed by a disconnectible inverter 46 which, if necessary, inverts the operational sign of the auxiliary signal $U_h$ before the correction signal $U_k$ is formed from the first differential signal $U_{d1}$ and the auxiliary signal $U_h$ in an adder 47 according to the following equation (2).

$$U_k=U_{d1}\pm U_h \quad (2)$$

The strength of the correction signal $U_k$ can be manually set by changing the amplification of the adder 47 by way of a potentiometer 48.

In the exemplary embodiment, the logic stage 45 is a multiplier so that the auxiliary signal $U_h$ arises as a result of product formation from the selected differential signal. It is within the scope of the present invention to link the differential signals to one another in any other suitable manner, for example, by addition or subtraction, in order to obtain the auxiliary signal $U_h$.

ASYMMETRICAL CONTRAST ENHANCEMENT

For an asymmetrical intensification of the image signal $U_b$, the auxiliary signal $U_h$ is formed, for example, according to the following equation (3) or the following equation (4).

$$U_h=U_{d1}\cdot U_{d3} \quad (3)$$

$$U_h=U_{d1}\cdot U_{d2} \quad (4)$$

The signal progression according to equation (3) is illustrated in the diagram (G) of FIG. 3.

The correction signal $U_k$ is then derived from the equations (2) and (3) at $$U_k=U_{d1}\pm U_{d1}\cdot U_{d3}$$

$$U_k=g_1(U_b-U_{u1})[1\pm(U_{u1}-U_{u2})] \quad (5)$$

The progression of the correction signal $U_k$ according to equation (5) is illustrated in the diagram (H) of FIG. 3. The progression 49a is derived by addition and the progression 49b illustrated with broken lines derives by subtraction of the differential signal $U_{d1}$ and the auxiliary signal $U_h$, whereby the inverter 46 is bypassed (switch 54 closed) in the case of addition.

The diagram (I) of FIG. 3 illustrates the result of the asymmetrical intensification of the image signal $U_b$* at an image signal jump 50 which may be assumed to have arisen in the master as a result of, for example, a contour from "black" to "white". One can see that whether the intensification of the image signal $U_b$* is to be over-emphasized toward "white" (progression 51) or, on the other hand, toward "black" (progression 52) can be determined by the amplitude relationship of the correction signal $U_k$ or, respectively, by the sum formation or the difference formation of the differential signal $U_{d1}$ and the auxiliary signal $U_h$.

The inversion of the auxiliary signal $U_h$ in the inverter 46 (switch 54 open) could also be made dependent upon whether the image signal jump occurs from "black" to "white" or vice versa.

SYMMETRICAL CONTRAST ENHANCEMENT

For a symmetrical steepening of the image signal $U_b$, all three differential signals $U_{d1}$, $U_{d2}$ and $U_{d3}$ are multiplied by one another in the logic stage 45 in accordance with the following equation (6).

$$U_h' = U_{d1} \cdot U_{d2} \cdot U_{d3} \qquad (6)$$

The progression of the auxiliary signal $U_h'$ is shown in the diagram K of FIG. 4. According to equations (2) and (6), the correction signal $U_k'$ which is illustrated in diagram (L) of FIG. 4 then derives at:

$$U_k' = U_{d1} \pm U_{d1} \cdot U_{d2} \cdot U_{d3}$$

$$U_k' = g_1(U_b - U_{u1})[1 \pm g_2(U_b - U_{u2})g_3(U_{u1} - U_{u2})]. \qquad (7)$$

The diagram (M) of FIG. 4 again illustrates the result of the symmetrical steepening of the image signal $U_b$* on the example of the image signal jump 50.

It be seen on the basis of the signal progressions in the diagram (I) of FIG. 3 and in the diagram (M) of FIG. 4 that, by incorporating a second outer field signal in the formation of the correction signal, the drop or, respectively, the rise from the maximum value and minimum value of the intensified image signal $U_b$* is significantly steeper than given traditional measures. By so doing, the "effective width" of the intensification and the width of the disturbing edges, for example, around letters, as well are reduced in an advantageous manner on the one hand, so that they no longer make such a strong visual impression. On the other hand, the signal transition from "black" to "white" or vice versa is also significantly steeper in the sense of a sharpness enhancement.

By selecting suitable weighting factors "g" according to equations (5) and (7), the reduction of the "effective width" of the steepening can be further optimized for different masters. An additional steepening in the line direction can be achieved by differentiation of the image signal.

In a preferred manner, the gradation curve according to which the image signal $U_b$ is distorted in the gradation stage 32 can be modified or, respectively, changed over as a function of the second outer field signal $U_{u2}$, whereby an improved depth intensification is achieved in the dark image passages of the master. In this case, one control input 53 of the gradation stage 32 is connected to the scanning device 9 by way of the line 24.

In case the image signal processing occurs digitally, it of course lies within the framework of the invention to construct the signal-shaping stage 29 with digital modules and to carry out the specified operations in a purely digital manner.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for contrast intensification in the reproduction of a master, comprising the steps of:
    (a) opto-electronically scanning a master image point-wise and line-wise to produce an image signal representing the brightness of an image point, a first outer field signal representing the mean brightness of a first scanning area larger than the image point, and a second outer field signal representing the mean brightness of a second scanning area about the image point and larger than the first scanning area;
    (b) forming a first differential signal from the image signal and the first outer field signal;
    (c) forming a second differential signal from the image signal and the second outer field signal;
    (d) forming a third differential signal from the first and second outer field signals;
    (e) combining the first differential signal with at least one of the second and third differential signals to produce an auxiliary signal;
    (f) adding the first differential signal and the auxiliary signal to produce a correction signal; and
    (g) superimposing said collection signal to said image signal.

2. The method of claim 1, and further comprising the step of:
    inverting the auxiliary signal prior to the step (f) of adding the first differential signal and the auxiliary signal.

3. The method of claim 1, wherein the step (a) of opto-electronically scanning is further defined as:
    (a1) illuminating the master point-wise and line-wise to produce an image light beam;
    (a2) splitting the image light beam into three portions;
    (a3) passing the three beam portions through respective diaphragms having respective apertures each of a different size defining the respective image point and first and second outer field areas; and
    (a4) applying each beam portion passed through a diaphragm to an opto-electronic transducer to generate the respective image and first and second outer field signals.

4. The method of claim 1, wherein the steps (b), (c) and (d) of forming first, second and third differential signals are respectively further defined as:
    (b1) applying the image signal and the first outer field signal to a first differential amplifier;
    (c1) applying the image signal and the second outer field signal to a second differential amplifier; and
    (d1) applying the first and second outer field signals to a third differential amplifier.

5. The method of claim 4, wherein the steps (b), (c) and (d) are further defined by the respective steps of:

(b2),(c2) and (d2) adjusting the amplification factor of the respective differential amplifiers to weight the differential signals.

6. The method of claim 1, wherein the step (e) of combining the differential signals is further defined as:
(e1) combining all three differential signals to obtain symmetrical contrast intensification.

7. The method of claim 1, wherein the step (e) of combining the differential signals is further defined as:
(e1) logically combining all three differential signals.

8. The method of claim 1, wherein the step (e) of combining the differential signals is further defined as: multiplying together all three differential signals.

9. The method of claim 1, wherein the image signal is modified in accordance with a gradation, and further comprising the steps:
(h) varying the gradation as a function of the second outer field signal.

10. The method of claim 1, wherein the step (a) of opto-electronically scanning is further defined as comprising the step of:
(i) calculating the first and second outer field signals from image points lying in respective scan areas.

11. An arrangement for contrast intensification in the reproduction of masters, comprising:
a scanner operable to scan a master point-wise and line-wise and including a first scanner circuit for producing an image signal in response to the brightness of an image point, a second scanner circuit for producing first outer field signal in response to the mean brightness of a first scanning field larger than that of the image point, and a third scanner circuit for producing a second outer field signal in response to the mean brightness of a second scanning field larger than the first scanning field;
differential signal means connected to said scanner and operable to produce a first differential signal in response to said image signal and first outer field signal, a second differential signal in response to said image signal and second outer field signal, and a third differential signal in response to said first and second outer field signals;
selection means connected to said differential signal means and operable to select differential signals for combining;
combining means connected to said selection means for combining the selected differential signals into an auxiliary signal; and
an arithmetic stage connected to said combining means and to said differential means for algebraically combining said auxiliary and first differential signals to form a correction signal.

12. The arrangement of claim 11, and further comprising:
a superposition stage connected to said arithmetic stage and said first scanner circuit for superimposing said image signal and said correction signal.

13. The arrangement of claim 11, wherein:
said combining means comprises a multiplier.

14. The arrangement of claim 11, wherein:
said second scanner circuit comprises a first diaphragm including a first aperture which determines a first outer field scanning area, and a first opto-electronic transducer light-coupled to said first aperture for producing the first outer field signal; and said third scanner circuit comprises a second diaphragm including a second aperture which determines a second outer field scanning area, and a second opto-electronic transducer light-coupled to said second aperture for producing the second outer field signal.

15. The arrangement of claim 11, wherein:
said differential signal means comprises first, second and third differential amplifiers,
said first differential amplifier connected to receive the image point and first outer field signals,
said second differential amplifier connected to receive said image point and second outer field signals, and
said third differential amplifier connected to receive said first and second outer field signals.

16. The arrangement of claim 11, and further comprising:
an inverter connected between said combining means and said arithmetic stage.

17. The arrangement of claim 11, wherein:
said arithmetic stage comprises an adder.

18. The arrangement of claim 11, wherein:
said arithmetic stage comprises a subtractor.

19. An arrangement for reproducing masters with a contrast intensification, comprising:
a first rotatable drum for carrying a master to be reproduced;
a second rotatable drum for carrying a recording medium;
a recording element operable to scan and record on the recording medium;
scanning means for scanning the master point-wise and line-wise, including
light means for causing a light beam to be transmitted from the master,
dividing means for dividing the light beam into first, second and third portions,
first, second and third diaphragms each disposed to respectively receive the first, second and third light beam portions and each including an aperture therethrough for passing a respective light component of the respective beam portion, said first diaphragm aperture defining an image point, said second diaphragm defining a first outer field about and larger than the image point, and said third diaphragm defining a second outer field about the image point and larger than the first outer field, and
first, second and third opto-electronic transducers each disposed to receive a respective light component from a respective diaphragm and operable in response thereto to produce respective image point, first outer field and second outer field signals;
first, second and third differential amplifiers, said first differential amplifier connected to receive and form a first differential signal from said image point signal and first outer field signal, said second differential amplifier connected to receive and form a second differential signal from said image point signal and said second outer field signal, and said third differential amplifier connected to receive and form a third differential signal from said first and second outer field signals;
a multiplier for multiplying together selected differential signals;

selection means connected between said first, second and third differential amplifiers and said multiplier for selecting differential signals for multiplication;

arithmetic means connected to said first differential amplifier and to said multiplier for algebraically adding said first differential signal and the product of multiplication to obtain an auxiliary signal;

superposition means connected to said first opto-electronic transducer and to said arithmetic means to superimpose said auxiliary and image point signals to form a correction signal; and drive means connected between said superposition means and said recording element to operate said recording element to reproduce the master on the recording medium.

* * * * *